(12) United States Patent
Wang

(10) Patent No.: US 7,908,229 B2
(45) Date of Patent: Mar. 15, 2011

(54) METHOD OF OPTIMIZING AN OPTICAL FILTER USING A DISTRIBUTED GENETIC ALGORITHM

(75) Inventor: Lei Wang, Singapore (SG)

(73) Assignee: Panasonic Corporation, Osaka (JP)

( * ) Notice: Subject to any disclaimer, the term of this patent is extended or adjusted under 35 U.S.C. 154(b) by 909 days.

(21) Appl. No.: 11/719,172

(22) PCT Filed: Dec. 1, 2005

(86) PCT No.: PCT/JP2005/022499
§ 371 (c)(1),
(2), (4) Date: May 11, 2007

(87) PCT Pub. No.: WO2006/059788
PCT Pub. Date: Jun. 8, 2006

(65) Prior Publication Data
US 2009/0271341 A1 Oct. 29, 2009

(30) Foreign Application Priority Data
Dec. 1, 2004 (JP) ................................ 2004-348086

(51) Int. Cl.
*G06N 5/00* (2006.01)
(52) U.S. Cl. ........................................... 706/13; 706/45
(58) Field of Classification Search .................... 706/13, 706/45
See application file for complete search history.

(56) References Cited

U.S. PATENT DOCUMENTS
6,532,453 B1 3/2003 Koza et al.

FOREIGN PATENT DOCUMENTS
| EP | 1 039 316 A2 | 9/2000 |
| JP | 2001-195380 A | 7/2001 |
| WO | WO 97/32259 A1 | 9/1997 |
| WO | WO 01/75425 A2 | 10/2001 |

OTHER PUBLICATIONS

Maier, Architecture and Access Protocol for a Wavelength-Selective Single Hop Packet Switched Metropolitan Area Network, Doctoral Thesis, University of Berlin, Jun. 6, 2003, pp. 1-305.*
Whitley, A Genetic Algorithm Tutorial, Statistics and Computing (1994), 4, pp. 65-85.*
Jin Cheng et al, "The Improvement of Genetic Algorithm Searching Performance", Proceedings of 2002 International Conference on Machine Learning and Cybernetics (Cat. No. 02EX583) IEEE Piscataway, NJ, US, vol. 2, 2002, pp. 947-951, vol. 2, XP002418365.
International Search Report for PCT/JP2005/022499, dated Jan. 3, 2007.

* cited by examiner

*Primary Examiner* — Wilbert L Starks, Jr.
(74) *Attorney, Agent, or Firm* — RatnerPrestia

(57) ABSTRACT

An optimization processing method comprises forming a plurality of islands each having a plurality of individuals and repeating crossover, mutation, evaluation and selection on the individuals until the desired condition has been satisfied by applying a genetic algorithm to each of the plurality of islands thereby obtaining an optimized solution, in which the optimized solution is obtained by migrating individuals to other islands.

2 Claims, 6 Drawing Sheets

Island

Individual A  A1 A2 A3 A4 ········· An

Individual B  B1 B2 B3 B4 ········· Bn

Individual C  X1 X2 X3 X4 ········· Xn

Individual A

Individual B

[After cross over]

Individual AA

Individual BB

[After mutation]

Individual AAA

METHOD OF OPTIMIZING AN OPTICAL FILTER USING A DISTRIBUTED GENETIC ALGORITHM

This application is a U.S. National Phase Application of PCT International Application PCT/JP2005/022499.

TECHNICAL FIELD

The present invention concerns a distributed genetic algorithm for selecting an optimized solution from various complex combinations.

BACKGROUND ART

As existing genetic algorithm, the one described in JP-A-2001-195380 has been known. The existing genetic algorithm will be briefly described with reference to a flow chart in FIG. 8.

In FIG. 8, a step S1 is a step for inputting initial values for respective setting values such as the number of elements in a pattern, the number of patterns in a pattern group, the target value of fitness, etc. A pattern generation group step S2 thereafter is a step for generating a pattern group comprising a plurality of mutually different patterns. A manipulating step S3 thereafter is a step for extracting a predetermined number of patterns from the pattern group and performing manipulation such as crossover on the elements of these patterns to generate new manipulated patterns. A selection step S4 thereafter is a step for selecting the same number of patterns having mutually different degree of adaptation as the extracted patterns from the extracted patterns and manipulated patterns based on the characteristics (degree of adaptation) obtained from these patterns. A substitution step S5 thereafter is a step adding a predetermined number of patterns selected in the selecting step to the pattern group in place of the extracted patterns. A step S6 thereafter is a step for repeating a series of algorithmic process steps comprising the manipulating step, the selection step and the substitution step until the best characteristic values in the preceding pattern group of the step S6 obtained in the algorithmic process steps may fall in the range of a desired value.

In the optimization method of using the genetic algorithm described above, calculations shown by the flow chart of FIG. 8 are repeated but it may possibly stain in a local solution since all the patterns belong to an identical pattern group. Therefore, a number of calculations had to be repeated in order to find an optimized value while avoiding such a local solution. In other words, it involves a subject to take much time until the optimized value is found in a case where a demand level for optimization is increased.

DISCLOSURE OF THE INVENTION

The distributed genetic algorithm according to the present invention is an optimization processing method including forming a plurality of islands each having a plurality of individuals and repeating crossover, mutation, evaluation and selection on the individuals until the desired condition has been satisfied by applying a genetic algorithm to each of the plurality of islands to thereby obtain an optimized solution, in which the optimized solution is obtained by migrating individuals to each islands.

BEST MODE FOR CARRYING OUT THE INVENTION

Embodiments

Figure 1:
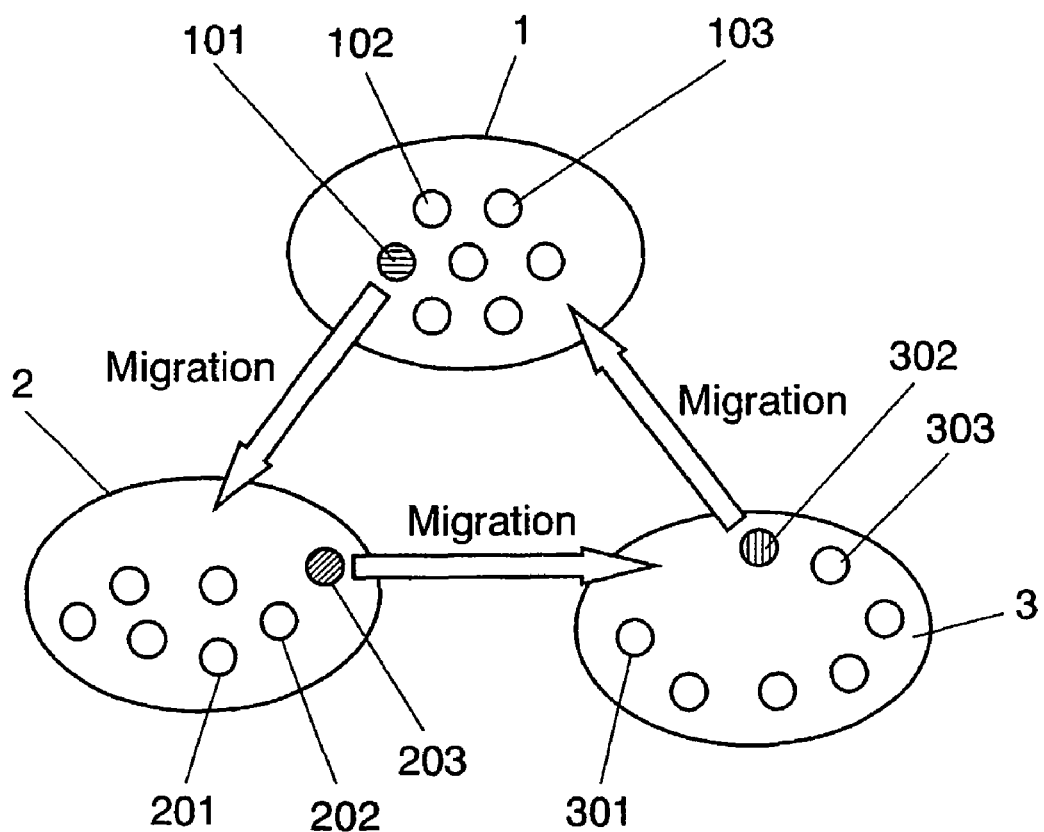
FIG. 1 is a view showing the concept of a distributed genetic algorithm in the Examples of the present invention.

FIG. 1 is a view expressing the concept of a distributed genetic algorithm according to the present invention. Individuals are present as: individuals 101, 102, 103, etc. in island 1; individuals 201, 202, 203, etc. in island 2; and individuals 301, 302, 303, etc. in island 3. Individual 101 in island 1, individual 203 in island 2 and individual 302 in island 3 are respectively selected at random and individual 101 is migrated to island 2, individual 203 is migrated to island 3 and individual 302 is migrated to island 1. After that, all of the individuals are evaluated and screened in each of the islands and the flow is repeated until an optimized value is obtained.

In this embodiment, since the distributed genetic algorithm is used for determining the optimized film thickness and the optimized number of layers of an optical filter comprising a multi-layered thin film, description will be made how to determine the film thickness and the number of layers.

Figures 2, 3:
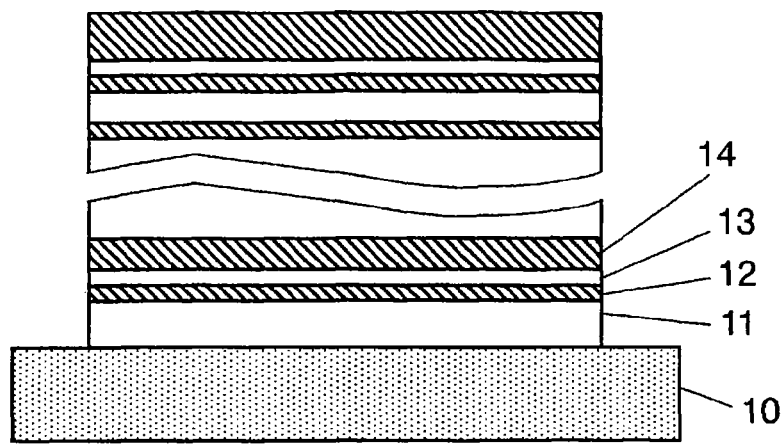
FIG. 2 is a cross sectional view showing the structure of an optical filter in the Examples of the present invention.
FIG. 3 is an explanatory view showing a relation between genes of individuals and the film thickness in the Examples of the present invention.

FIG. 2 is a Cross sectional view showing the structure of an optical filter. In an optical filter of a multi-layered thin film as shown in FIG. 2, thin films of silicon dioxide and tantalum pentoxide are formed alternately over glass substrate 10 such as: first layer 11 comprising silicon dioxide, second layer 12 comprising tantalum pentoxide, third layer 13 comprising silicon dioxide and fourth layer 14 comprising tantalum pentoxide. By forming the respective silicon dioxide and tantalum pentoxide layers with changing the film thickness, a desired characteristic of transmittance (wavelength and transmittance) as an optical filer can be obtained.

A method of determining the optimized value for the film thickness of each layer of the optical filter having a desired characteristic of transmittance will be described further in detail.

FIG. 3 shows a relation between each of individuals present in an island and the film thickness of the multi-layered thin film. In FIG. 3, individual A includes genes A1, A2, A3, A4, . . . and An and the A1 gene correspond to the film thickness, that is, A1 for the first layer, A2 for the second layer, . . . and An for the n-th layer. Individuals are present from A to X in this island while a plurality of individuals each comprising different genes are present in other islands.

Figure 4:
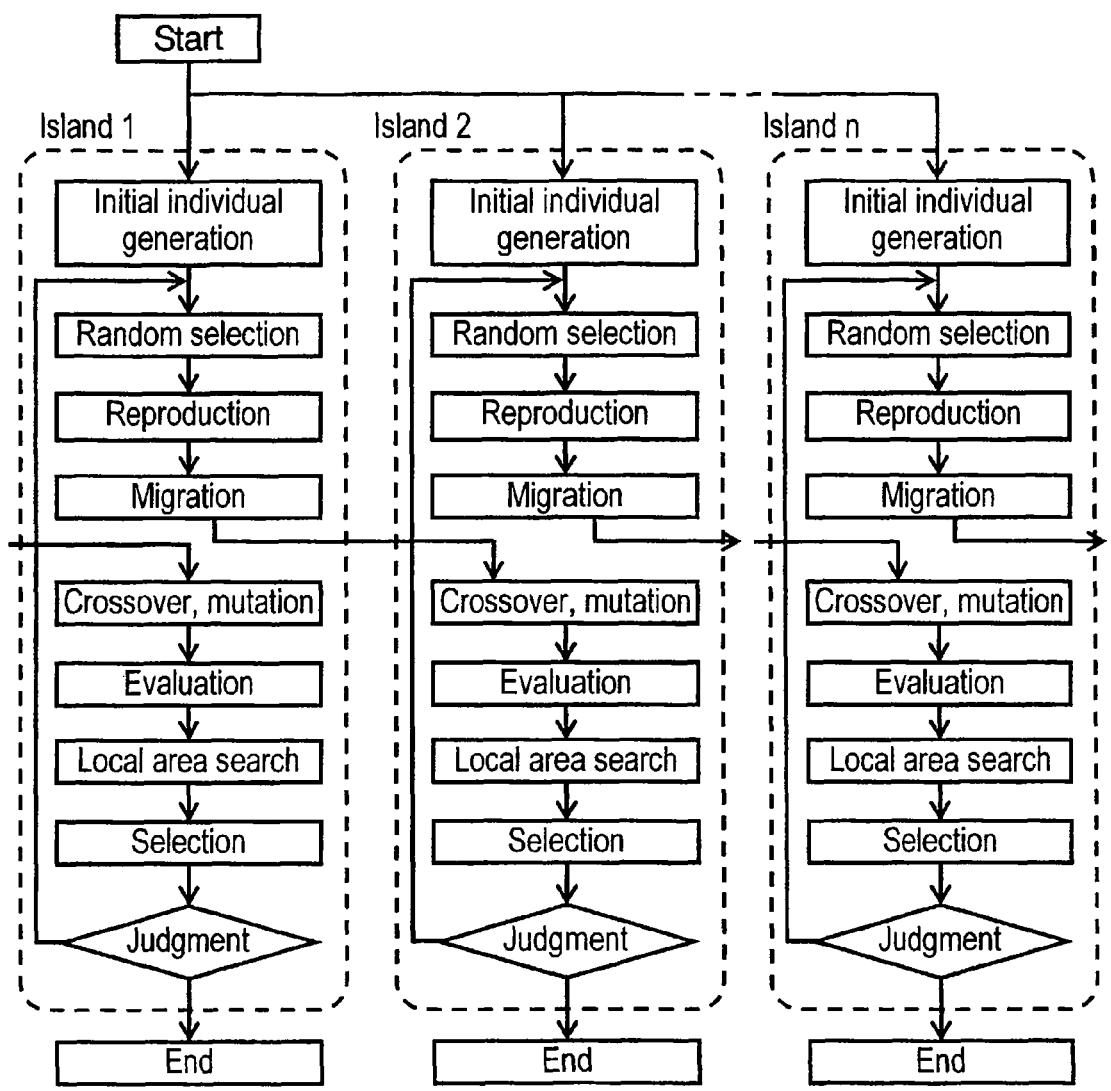
FIG. 4 is a flow chart showing the distributed genetic algorithm in the Examples of the present invention.

FIG. 4 is a flow chart showing the distributed genetic algorithm in the Examples of the present invention. In FIG. 4, a predetermined number of initial individuals are generated in island 1 and the individuals to be migrated to other islands (island 2 in this case) are selected at random. With regard to a method for random selection, there are methods where random number is generated and an individual corresponding to the resulting number is selected, etc. but they are non-limitative and other method where the corresponding individual to the time for the selection treatment is randomly selected, etc. may be used as well.

Figure 7:
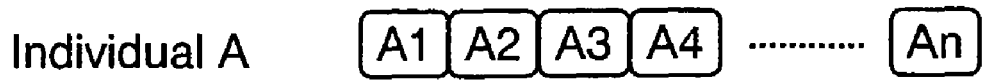
FIG. 7 is an explanatory view showing a crossover and a mutation.
Figure 7:
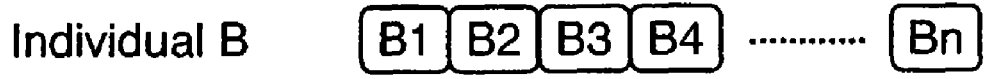
Figure 7:
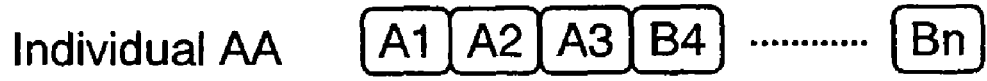
Figure 7:
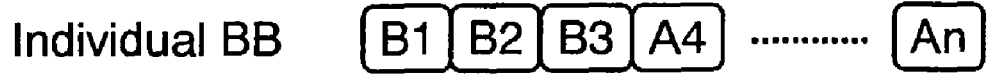
Figure 7:
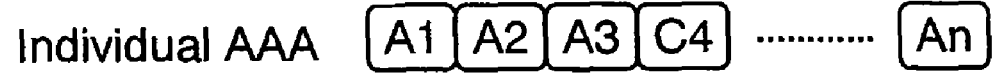
Figure 8:
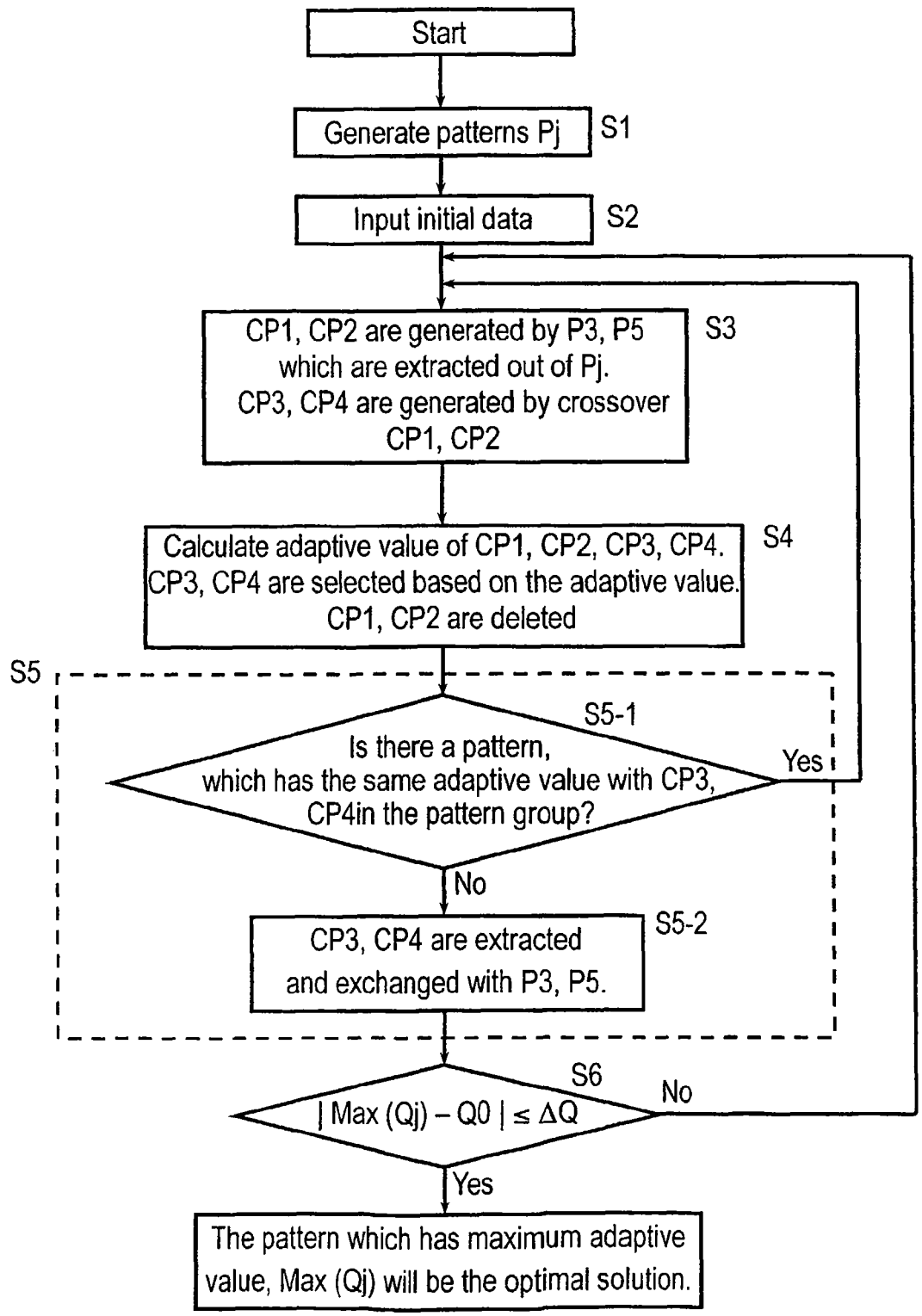
FIG. 8 is a flow chart for explaining an existent genetic algorithm.

Then the selected individual is duplicated and migrated to island 2. In island 2, the individual migrated from island 1 is subjected to crossover with the individual in island 2 and to mutation. FIG. 7 is a explanatory view showing a crossover of the individual A=(A1, A2, A3, A4, A5, . . . An) with the individual B=(B1, B2, B3, B4, B5, . . . Bn) and a mutation of the individual A. For example, crossover of the third gene with the fourth gene means that the fourth gene and thereafter in each of individuals A and B is substituted. Thus, a new individual AA=(A1, A2, A3, B4, B5, . . . Bn) is generated from A while, from B, a new individual BB=(B1, B2, B3, A4, A5, . . . An) is generated. Further, mutation is a manipulation where a gene is substituted with another gene. Thus, as a result of mutation where the fourth gene A4 in the individual A is substituted with C4 (C4 is different from A4), a new individual AAA=(A1, A2, A3, C4, A5, . . . An) is generated.

Similarly, a predetermined numbers of initial individuals are also generated in island 2 and then an individual to be migrated to island 3 is selected at random. Then the individual is duplicated and migrated to island 2. In island 3, the individual which is migrated from island 2 is subjected to crossover with the individual present in island 3 or to mutation. Further, the similar manipulation is further carried out in island 3 as well.

After that, for each island, an evaluation value is calculated for all the individuals in the island. The evaluation value is calculated according to the following formula on every island assuming the difference between a desired transmittance and a calculated transmittance as Err.

$$E_{val} = 0.8 \times \sum_{i=1}^{n} Err^2 + 0.2 \times [\max(Err) - \min(Err)] \quad (1)$$

Then, after calculation of the evaluation value for each of the individuals, a local area search is conducted for each individuals selected at random in the island. The local area search means to conduct search on the result obtained by applying the genetic algorithm as to whether better result is present or not for a certain parameter of a certain individual by changing the parameter slightly. The parameter referred to herein is a film thickness of the thin film for each layer. Incidentally, the maximum number of layers is able to be defined by a user (100 layers typically).

Figure 5:
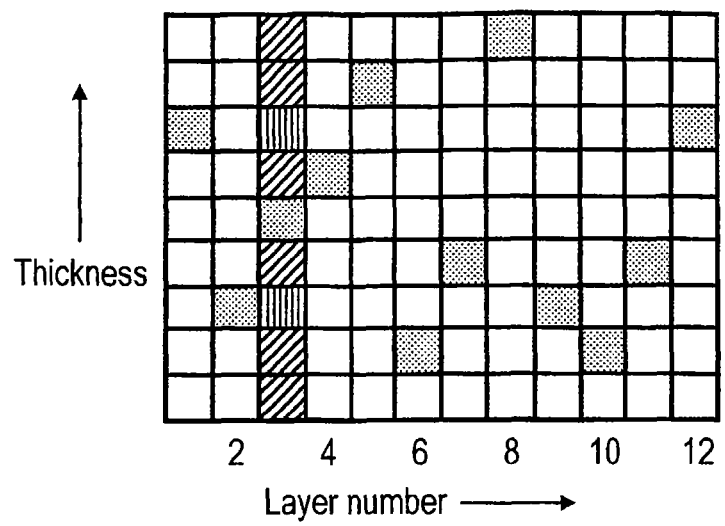
FIG. 5 is an explanatory view for local area search in the distributed genetic algorithm in the Examples of the present invention.

The local area search in determining the optimized film thickness of an optical filter will be described with reference to the drawings. FIG. 5 is an explanatory view for local area search in the distributed genetic algorithm in the Examples of the present invention. FIG. 5 schematically shows genes of a certain individual, that is, the film thickness for each layer assuming the number of layers as 12 and the film thickness as 9 levels. In FIG. 5, each layer No. is expressed on the abscissa and the film thickness of each layer is expressed on the ordinate. A portion painted with dots in each layer is the film thickness for each layer. To conduct a local area search for film thickness of a certain gene in the third layer randomly selected here means to search whether there is any better film thickness value. Evaluation is conducted for cells indicated by longitudinal lines spaced apart upward and downward by two cells from the cell painted with dots in the third layer and, in case the value where the value for the film thickness of the upper or the lower cell is better than the film thickness of the cell painted with dots, the better film thickness is remained as the film thickness for the third layer. Further, in case the value of the cell painted with dots is better than the film thickness for either the upper or the lower cell, the film thickness of the cell painted with dots is remained and local area search in this generation is completed.

Local area search is conducted on every generation in each island. The gene for the search, that is, No. of a certain layer is selected at random. However, in a case where third layer is selected again after plural generations, the local area search is conducted on the remaining cells excluding the two cells having not remained as the result of previous local area search. That is, when local area search is conducted on the cell indicated by the longitudinal lines of the third layer and in a case where the evaluation for the cells of the longitudinal lines is not good and not remained, the subsequent local area search in the third layer is conducted by selecting two cells out of those shown by oblique lines.

Back to FIG. 4, an illustration will be continued. In FIG. 4, when the local area search is completed, individuals of poor evaluation value are selected and excluded in each of the islands to complete one generation of the distributed genetic algorithm. In this case, it is judged whether the evaluation value satisfied the set value or not and, if it is not judged as completed, the flow returns to the former random selection and identical processing is repeated. Then, when it is judged that the evaluation value of the individual has satisfied the set value, it is considered to be optimized and the search for optimized film thickness value of the optical filter or the optimization processing is ended. The series of loops is conducted on every island and migration of individuals is conducted over each of the islands.

Figure 6:
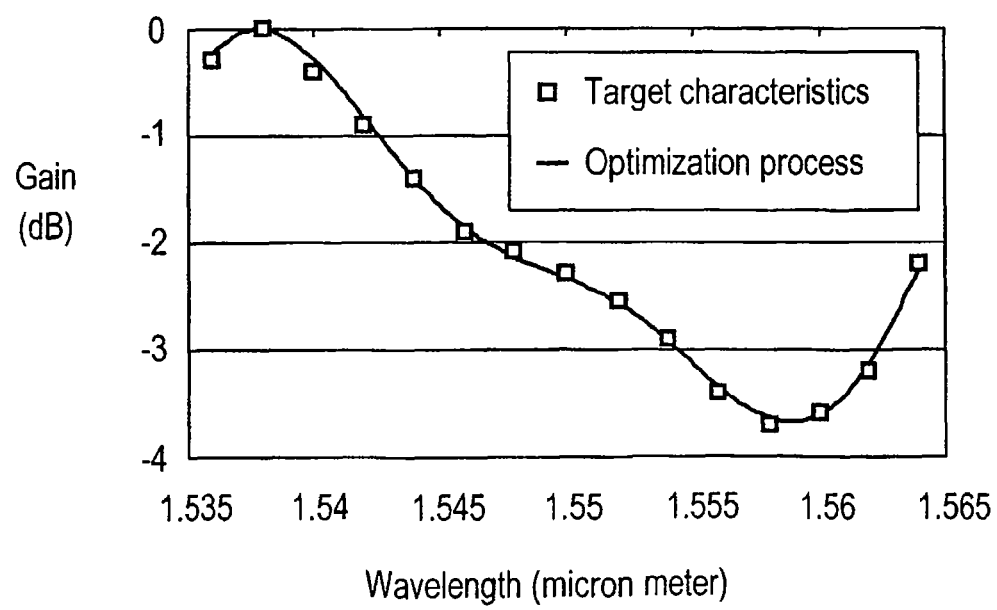
FIG. 6 is a view comparing a calculated value to an aimed value of gain characteristics of an optical filter of a multi-layered thin film obtained in the Examples of the present invention.

In the optical filter of the multi-layered thin film, the first layer comprises silicon oxide and has a refractive index of 1.451531 while the second layer comprises tantalum pentoxide and has a refractive index of 2.059358. In the optical filter, since such layers are formed alternately, all the odd-number thin film layers comprise silicon dioxide and all the even-number thin film layers comprise tantalum pentoxide. In the optimization processing method of this embodiment, optimization processing of evaluating five islands with the number of individuals in the island 200, that is, individuals by the number of 1,000 for one generation, was conducted. FIG. 6 is a view comparing a calculated value to an aimed value of gain characteristics of an optical filter of a multi-layered thin film obtained in the embodiment of the present invention. An abscissa shows wavelength of light coming into an optical filter and an ordinate shows transmittance as gain in decibel (dB). Table 1 shows each of the film thickness of the multi-layered thin film obtained by the optimization processing method of the Examples of the present invention.

TABLE 1

|  | Film Thickness (nm) |
| --- | --- |
| First Layer | 2143 |
| Second Layer | 2355 |
| Third Layer | 1019 |
| Fourth Layer | 867 |
| Fifth Layer | 458 |
| Sixth Layer | 952 |
| Seventh Layer | 1365 |
| Eighth Layer | 24 |
| Ninth Layer | 1075 |

TABLE 1-continued

| | Film Thickness (nm) |
|---|---|
| Tenth Layer | 2792 |
| Eleventh Layer | 2357 |
| Twelfth Layer | 1897 |
| Thirteenth Layer | 225 |
| Fourteenth Layer | 2031 |
| Fifteenth Layer | 149 |
| Sixteenth Layer | 378 |
| Seventeenth Layer | 2069 |
| Eighteenth Layer | 71 |
| Nineteenth Layer | 480 |
| Twentieth Layer | 168 |
| Twenty-first Layer | 2508 |
| Twenty-second Layer | 1236 |
| Twenty-third Layer | 1217 |
| Twenty-fourth Layer | 1147 |
| Twenty-fifth Layer | 2583 |
| Twenty-sixth Layer | 2598 |
| Twenty-seventh Layer | 254 |
| Twenty-eighth Layer | 1560 |
| Twenty-ninth Layer | 2214 |
| Thirtieth Layer | 2789 |
| Thirty-first Layer | 2104 |
| Thirty-second Layer | 1440 |
| Thirty-third Layer | 2221 |
| Thirty-fourth Layer | 915 |

As described above, according to the present optimization processing method, designated values for an optical filter of a multi-layered film having characteristics much closer to aimed characteristics can be obtained easily.

An optimization processing method using distributed genetic algorithm according to the present invention is that genetic algorithm is applied to each island, the individual is selected at random for each generation to migrate among islands and the optimized solution is determined. When the present method is carried out, individuals in the same quality are not accumulated to each island unlike in the case where optimum individual for each island is migrated to another island and, therefore, the outcome is not merely local solution but is able to reach an optimized solution. In addition, it is now possible that calculation of genetic algorithm in each island is conducted using different electronic computers and calculation within far shorter time is now possible.

INDUSTRIAL APPLICABILITY

The optimization processing method using the distributed genetic algorithm according to the present invention is useful as an optimization processing method for solving optimization problems, etc. by using an electronic computer.

The invention claimed is:

1. An optimization processing method comprising:
   forming a plurality of islands each having a plurality of individuals;
   repeating a flow of crossover, mutation, evaluation and selection on the individuals until a desired condition has been satisfied by applying a genetic algorithm to each of the plurality of islands; and
   obtaining an optimized solution, in which the optimized solution is obtained by migrating the individuals to other islands,
   wherein there is a step of conducting a local area search for a step on one parameter for individuals in the flow of the genetic algorithm,
   wherein the local area search is conducted at a certain step on one parameter of individuals and, in a case where good solution can not be obtained, the step is stored and the local area search is conducted at a step other than the step described above in a case where search is conducted on the identical parameter in the next generation.

2. A method of manufacturing an optical filter, the manufacturing method comprising the steps of:
   forming layers of film on a substrate until a desired number of the layers of film has been obtained, each layer of film alternately comprising a first oxide material or a second oxide material, the first oxide material being different from the second oxide material; and
   obtaining an optimized value of thickness of each layer of film by an optimization processing method comprising the following sub-steps:
   forming a plurality of islands each having a plurality of individuals, each individual comprising genes and each gene corresponding to a value of thickness of each layer of film;
   repeating a flow of crossover, mutation, evaluation and selection on the individuals until a desired characteristic of the optical filter has been satisfied by applying a genetic algorithm to each of the plurality of islands; and
   obtaining the optimized value of thickness of each layer of film by migrating the individuals to other islands,
   wherein the optimization processing method comprises a step of conducting a local area search for a value of thickness of a layer of film for certain individuals in the flow of the genetic algorithm.

* * * * *